United States Patent
Nemoto

(10) Patent No.: US 8,983,329 B2
(45) Date of Patent: Mar. 17, 2015

(54) PIEZOELECTRIC TRANSFORMER TYPE HIGH-VOLTAGE POWER SUPPLY DEVICE AND IMAGE FORMING APPARATUS

(75) Inventor: Kenji Nemoto, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 13/087,319

(22) Filed: Apr. 14, 2011

(65) Prior Publication Data

US 2011/0293311 A1 Dec. 1, 2011

(30) Foreign Application Priority Data

May 25, 2010 (JP) .................................. 2010-119730

(51) Int. Cl.
*G03G 15/00* (2006.01)
*H02M 3/335* (2006.01)
(52) U.S. Cl.
CPC ....... *G03G 15/5004* (2013.01); *H02M 3/33507* (2013.01)
USPC ............................. 399/88; 363/21.13; 399/37
(58) Field of Classification Search
USPC ................. 399/88, 50, 55, 66, 37; 363/21.02, 363/21.13, 157
See application file for complete search history.

(56) References Cited

U.S. PATENT DOCUMENTS

| | | | | |
|---|---|---|---|---|
| 5,998,937 A | * | 12/1999 | Nishigaki | ............... 315/209 PZ |
| 2010/0104313 A1 | * | 4/2010 | Kosaka et al. | ................... 399/88 |
| 2011/0051466 A1 | * | 3/2011 | Kosaka | ....................... 363/21.02 |

FOREIGN PATENT DOCUMENTS

JP 11-206113 7/1999

* cited by examiner

*Primary Examiner* — Sophia S Chen
(74) *Attorney, Agent, or Firm* — Fitzpatrick, Cella, Harper & Scinto

(57) ABSTRACT

A high-voltage power supply device includes: a piezoelectric transformer; a driving unit of the piezoelectric transformer; a detection unit configured to detect an output of the piezoelectric transformer; and a control unit configured to control the output of the piezoelectric transformer by giving a driving signal to the driving unit so that the output detected by the detection unit reaches a target value, wherein the control unit changes a frequency of the driving signal without changing a duty of the driving signal so as to set the frequency of the driving signal such that the output detected by the detection unit falls within a predetermined range including the target value, and after setting the frequency for the driving signal such that the output detected by the detection unit falls within the predetermined range, changes the duty of the driving signal so that the output detected by the detection unit reaches the target value.

29 Claims, 11 Drawing Sheets

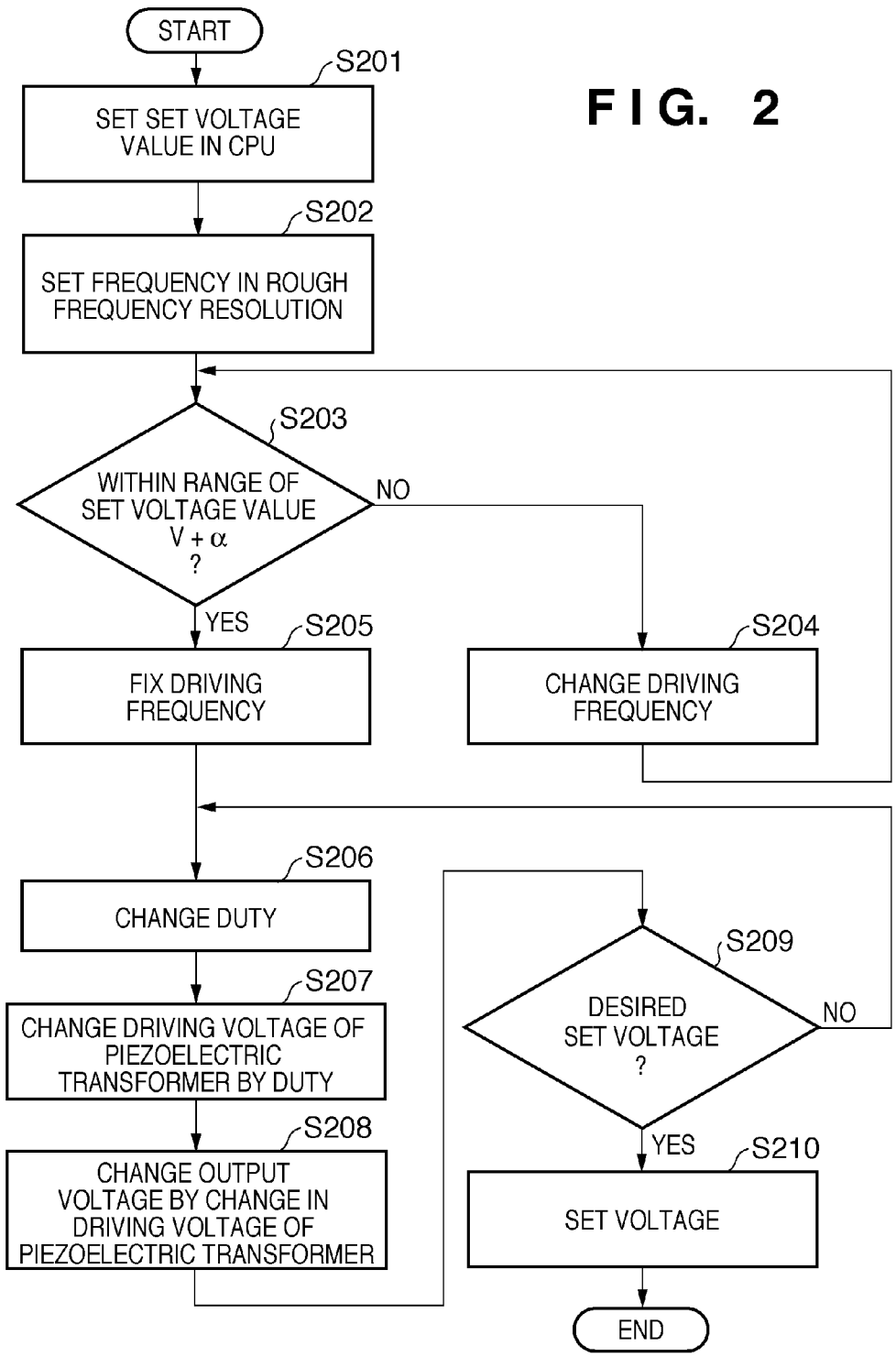
F I G. 2

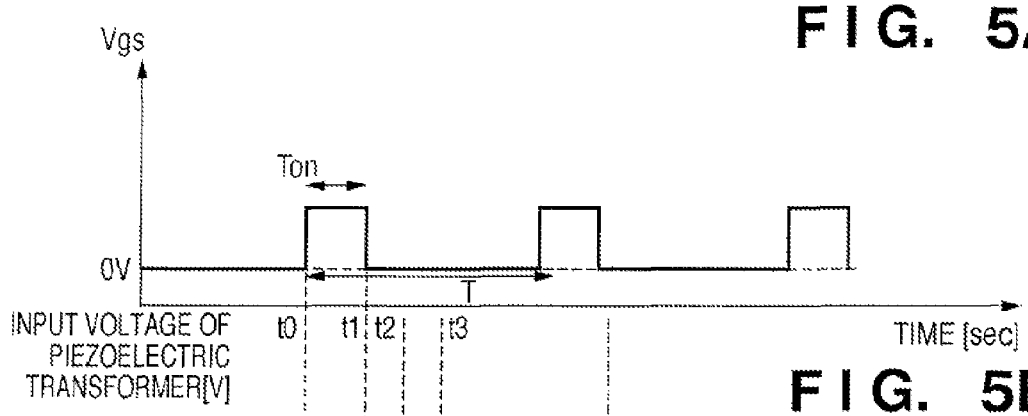
FIG. 5A
FIG. 5B
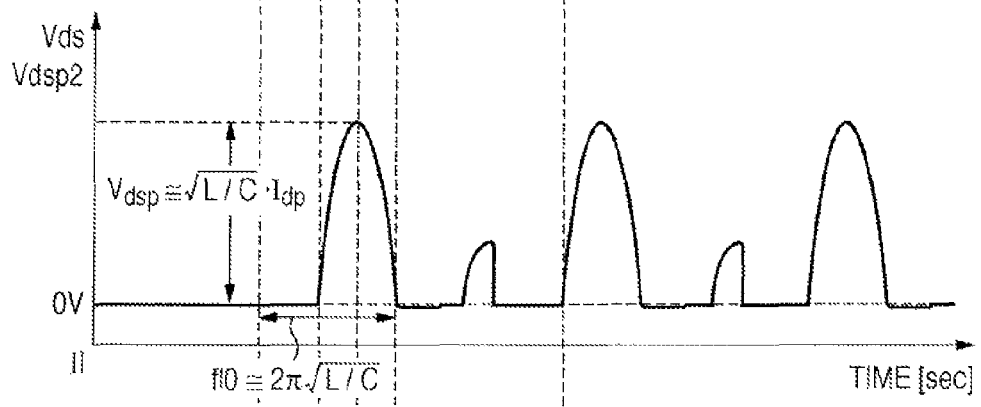
FIG. 5C
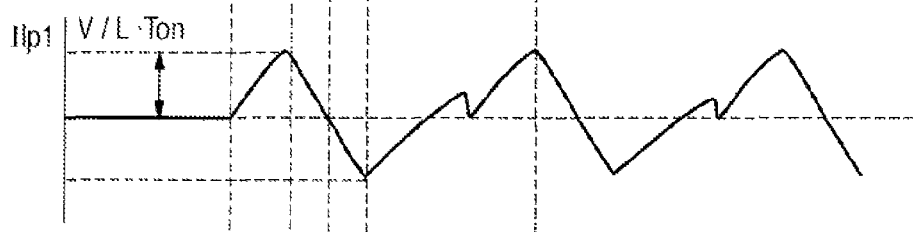
FIG. 5D
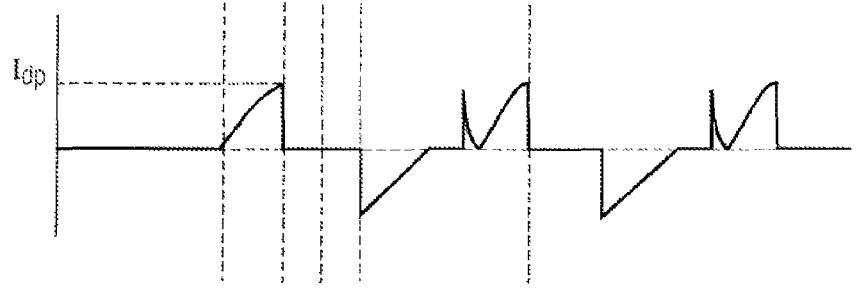

PIEZOELECTRIC TRANSFORMER TYPE HIGH-VOLTAGE POWER SUPPLY DEVICE AND IMAGE FORMING APPARATUS

BACKGROUND OF THE INVENTION

1. Field of the Invention

The present invention relates to a piezoelectric transformer type high-voltage power supply device and an image forming apparatus and, more particularly, to a technique of controlling an output voltage or an output current.

2. Description of the Related Art

A conventionally known electrophotographic image forming apparatus uses a DC bias voltage as a voltage to be applied to the transfer member. To generate a high voltage necessary for image formation, a wire-wound electromagnetic transformer has been used conventionally. However, the output current value of the electromagnetic transformer used in the image forming apparatus of the above-described specifications is as small as several μA. Hence, the leakage current needs to be minimized in every unit. To do this, the winding of the transformer needs to be insulated by molding or the like. In addition, the transformer needs to be relatively large to its supply power. For these reasons, it is difficult to reduce the size and weight of the high-voltage power supply device.

To solve these problems, a proposal has been made to generate a high voltage using a slim and lightweight high-power piezoelectric transformer (Japanese Patent Laid-Open No. 11-206113). More specifically, using a piezoelectric transformer made of a ceramic makes it possible to generate a high voltage at an efficiency higher than that of the electromagnetic transformer and also increase the distance between the primary side electrode and the secondary side electrode. Since the special molding for insulation is unnecessary, the high-voltage generator can be made compact and lightweight.

Japanese Patent Laid-Open No. 11-206113 discloses a high-voltage power supply device which causes a voltage controlled oscillator (VCO) formed from an analog circuit to generate a driving frequency to be input to the piezoelectric transformer. As a feature of the piezoelectric transformer, its output voltage is maximized at the resonance frequency. It is therefore possible to control the output voltage by the frequency. Note that as the features of the relationship between the driving frequency and the output voltage, the output voltage is maximized at the resonance frequency and lowers as the frequency becomes higher or lower than the resonance frequency. The high-voltage power supply device described in Japanese Patent Laid-Open No. 11-206113 controls the frequency output from the VCO, thereby controlling the output voltage of the piezoelectric transformer.

Recently demanded is space saving using fewer components. As described above, the control circuit portion of the piezoelectric transformer is formed from an analog circuit in most cases and therefore includes many components. To decrease the number of components of the control circuit portion and implement a space-saving piezoelectric transformer, the control circuit portion is formed as an IC on one chip. However, since the number of pins of an IC is limited, the IC may be unusable in a small package. In addition, when the package is small, and ten-odd piezoelectric transformers are used as in a color printer, a plurality of control ICs are necessary, and a large space-saving effect is difficult to obtain. In this case, the ICs are formed on one chip together with the CPU and the ASIC of the controller of the printer engine unit. In this method, a large space-saving effect can be obtained. The control circuit can be formed from not an analog circuit as before but a digital circuit. However, when the control circuit portion of the piezoelectric transformer is digitized, driving control of the piezoelectric transformer and, more particularly, output voltage control by a variable frequency requires a high frequency accuracy. That is, for accurate frequency control, the CPU or the ASIC needs to have a very high operation clock speed.

For example, when a 10-bit counter (the MAX count is 1024) counts 602 pulses in both H and L levels (the count is 1204 in one period) for pulse generation, the output frequency value is 166.113 KHz. When 603 H pulses and 602 L pulses are counted (the count is 1205 in one period), the output frequency value is 165.975 KHz. The frequency difference Δf is 120 Hz. When the frequency changes by 100 Hz, the output voltage changes by about 20 V. To avoid any influence on an image, the voltage needs to change at an accuracy of 2.0 V or less. To change the voltage at an accuracy of 1.5 V or less, a frequency resolution of 10 Hz or less is necessary. In that case, the frequency of the operation clock of the CPU or the ASIC needs to be 2 GHz or more. That is, examples of problems posed by speeding up the internal operation clock are an increase in unwanted radiation noise, higher power consumption, and an increase in the cost caused by the semiconductor microfabrication process.

SUMMARY OF THE INVENTION

The present invention has been made in consideration of the above-described problems, and provides an inexpensive image processing apparatus which performs processing only in an image composition region while keeping image data compressed, thereby processing even high-resolution image data in a short time.

According to one aspect of the present invention, there is provided a high-voltage power supply device comprising: a piezoelectric transformer; a driving unit of the piezoelectric transformer; a detection unit configured to detect the output of the piezoelectric transformer; and a control unit configured to control the output of the piezoelectric transformer by giving a driving signal to the driving unit so that the output detected by the detection unit reaches a target value, wherein the control unit changes a frequency of the driving signal without changing a duty of the driving signal so as to set the frequency of the driving signal such that the output falls within a predetermined range including the target value, and after setting the frequency for the output within the predetermined range, changes the duty of the driving signal so that the output reaches the target value.

According to another aspect of the present invention, there is provided an image forming apparatus comprising: an image forming unit configured to form an image; and a high-voltage power supply configured to output a high voltage to the image forming unit, the high-voltage power supply comprising a piezoelectric transformer, a driving unit of the piezoelectric transformer, a detection unit configured to detect the output of the piezoelectric transformer, and a control unit configured to control the output of the piezoelectric transformer by giving a driving signal to the driving unit so that the output detected by the detection unit reaches a target value, wherein the control unit changes a frequency of the driving signal without changing a duty of the driving signal so as to set the frequency such that the output falls within a predetermined range including the target value, and after setting the frequency for the output within the predetermined range, changes the duty of the driving signal so that the output reaches the target value.

According to another aspect of the present invention, there is provided a high-voltage power supply device comprising: a piezoelectric transformer; a driving unit of the piezoelectric transformer; a detection unit configured to detect the output of the piezoelectric transformer; a control unit configured to control the output of the piezoelectric transformer by giving a driving signal to the driving unit so that the output detected by the detection unit reaches a target value; and a storage unit configured to store a frequency of the driving signal and a value of the output detected by the detection unit and corresponding to the frequency of the driving signal in association with each other, wherein the control unit causes the storage unit to store the frequency of the driving signal given to the driving unit and the value of the output corresponding to the frequency of the driving signal in association with each other upon sweeping the driving signal, supplies the frequency of the driving signal to the driving unit based on the frequency of the driving signal and the value of the output corresponding to the frequency stored in the storage unit upon frequency sweep such that the output of the piezoelectric transformer falls within a predetermined range with respect to the target value, and after that, changes a duty of the driving signal so that the value of the output reaches the target value.

According to another aspect of the present invention, there is provided a high-voltage power supply device comprising: a piezoelectric transformer; a driving unit of the piezoelectric transformer; a detection unit configured to detect the output of the piezoelectric transformer; a control unit configured to control the output of the piezoelectric transformer by giving a driving signal to the driving unit so that the output detected by the detection unit reaches a target value; and a storage unit configured to store a frequency of the driving signal and a value of the output detected by the detection unit and corresponding to the frequency of the driving signal in association with each other, wherein the control unit changes the frequency of the driving signal without changing a duty of the driving signal such that the value of the output of the piezoelectric transformer falls within a predetermined range with respect to the target value, causes the storage unit to store the frequency of the driving signal for the output within the predetermined range with respect to the target value, supplies the frequency of the driving signal for the output within the predetermined range with respect to the target value to the driving unit using the frequency of the driving signal stored in the storage unit, and after that, changes the duty of the driving signal so that the value of the output reaches the target value.

According to another aspect of the present invention, there is provided an image forming apparatus comprising: an image forming unit configured to form an image; and a high-voltage power supply configured to output a high voltage to the image forming unit, the high-voltage power supply comprising a piezoelectric transformer, a driving unit of the piezoelectric transformer, a detection unit configured to detect the output of the piezoelectric transformer, a control unit configured to control the output of the piezoelectric transformer by giving a driving signal to the driving unit so that the output detected by the detection unit reaches a target value, and a storage unit configured to store a frequency of the driving signal and a value of the output detected by the detection unit and corresponding to the frequency of the driving signal in association with each other, wherein the control unit changes the frequency of the driving signal without changing a duty of the driving signal such that the value of the output of the piezoelectric transformer falls within a predetermined range with respect to the target value, causes the storage unit to store the frequency of the driving signal for the output within the predetermined range with respect to the target value, supplies the frequency of the driving signal to the driving unit using the frequency of the driving signal stored in the storage unit so that the output falls within the predetermined range with respect to the target value, and after that, changes the duty of the driving signal so that the value of one of the output voltage and an output current reaches the target value.

According to another aspect of the present invention, there is provided an image forming apparatus comprising: an image forming unit configured to form an image; and a high-voltage power supply configured to output a high voltage to the image forming unit, the high-voltage power supply comprising a piezoelectric transformer, a driving unit of the piezoelectric transformer, a detection unit configured to detect the output of the piezoelectric transformer, a control unit configured to control the output of the piezoelectric transformer by giving a driving signal to the driving unit so that the output detected by the detection unit reaches a target value, and a storage unit configured to store a frequency of the driving signal and a value of the output detected by the detection unit and corresponding to the frequency of the driving signal in association with each other, wherein the control unit changes the frequency of the driving signal without changing a duty of the driving signal such that the value of the output of the piezoelectric transformer falls within a predetermined range with respect to the target value, causes the storage unit to store the frequency of the driving signal for the output within the predetermined range with respect to the target value, supplies the frequency of the driving signal for the output within the predetermined range with respect to the target value to the driving unit using the frequency of the driving signal stored in the storage unit, and after that, changes the duty of the driving signal so that the value of the output reaches the target value.

According to the present invention, it is possible to accurately control the output voltage without speeding up the operation clock in digital control of a piezoelectric transformer.

Further features of the present invention will become apparent from the following description of exemplary embodiments (with reference to the attached drawings).

BRIEF DESCRIPTION OF THE DRAWINGS

FIG. 2 is a flowchart of control according to the first embodiment;

FIGS. 5A to 5D are timing charts showing operation waveforms in duty variable control according to the first and second embodiments;

DESCRIPTION OF THE EMBODIMENTS

First Embodiment

Figure 1:
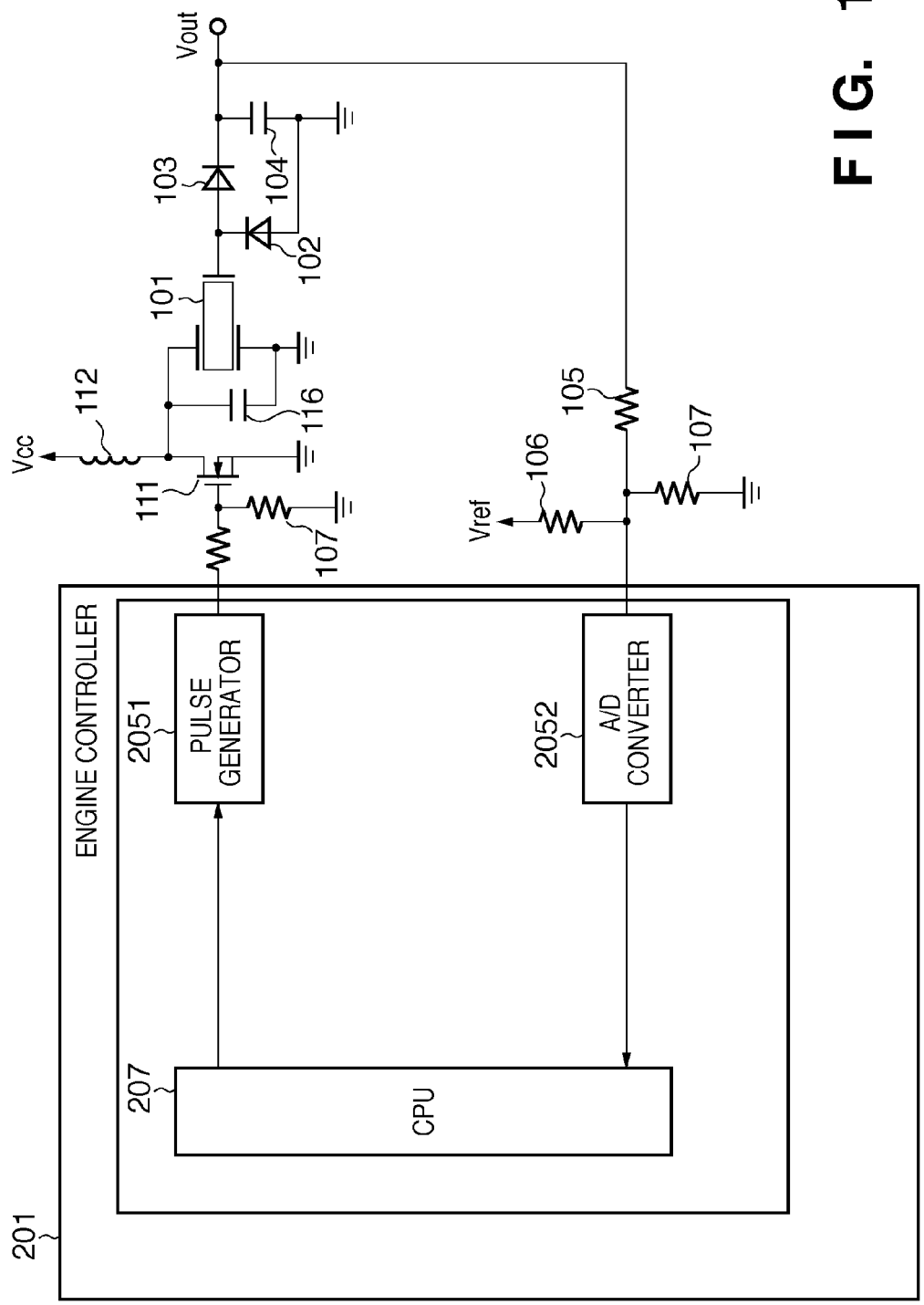
FIG. 1 is a block diagram showing the arrangement of a piezoelectric transformer type high-voltage power supply according to the first embodiment.

The first embodiment of the present invention will now be described. However, this embodiment is merely an example, and the present invention is not limited to these arrangements. A conventional piezoelectric transformer type high-voltage power supply will briefly be described first with reference to FIG. 11. The illustrated circuit is a high-voltage power supply and includes a piezoelectric transformer (piezoelectric ceramic transformer) 101 of the high-voltage power supply. The output of the piezoelectric transformer 101 is rectified and smoothed to a positive voltage by diodes 102 and 103 and a high-voltage capacitor 104 and supplied to a transfer roller (not shown) serving as a load. That is, the diodes 102 and 103 and the high-voltage capacitor 104 function as a rectification circuit. An LC resonance circuit using an FET 111 as a switching element serves as a driving circuit. As described above, the DC high-voltage generation circuit includes the driving circuit, the piezoelectric transformer, and the rectification circuit.

Resistors 105, 106, and 107 divide the output voltage which is then input to the noninverting input terminal (+terminal) of an operational amplifier 109 via a protective resistor 108. On the other hand, the inverting input terminal (−terminal) of the operational amplifier receives an analog control signal Vcont of the high-voltage power supply via a resistor 114. The operational amplifier 109, the resistor 114, and a capacitor 113 that are configured as illustrated function as an integration circuit for the control signal Vcont. The control signal is smoothed by an integration time constant determined by the component values of the resistor and the capacitor, and input to the operational amplifier 109. The output terminal of the operational amplifier 109 is connected to a voltage controlled oscillator (VCO) 110. The voltage controlled oscillator (VCO) 110 switches the switching element 111 by a frequency corresponding to the output voltage from the operational amplifier 109. The voltage is amplified by an inductor 112 and supplied to the primary side of the piezoelectric transformer.

[System Configuration]

Figure 10:
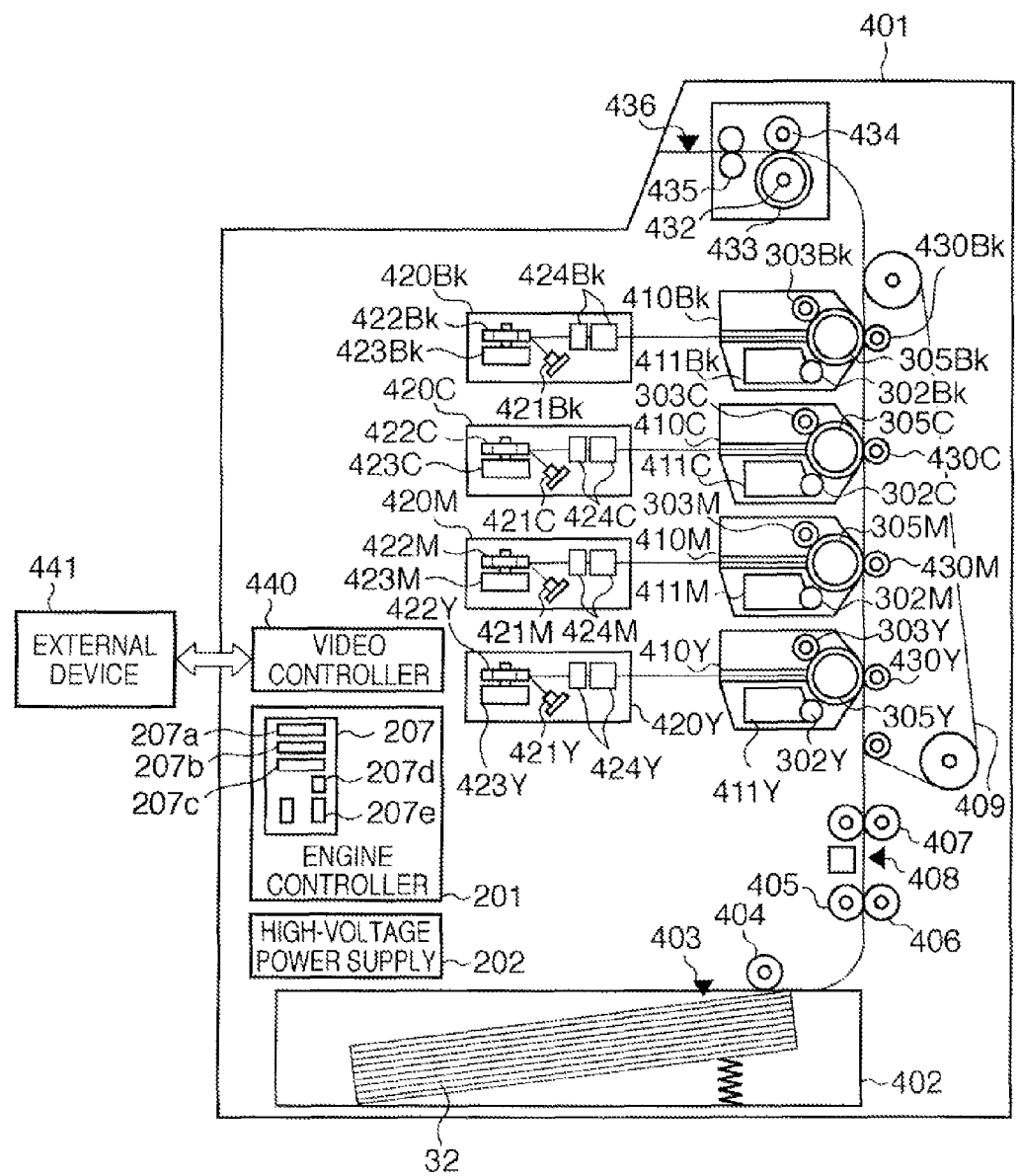
FIG. 10 is a sectional view showing the arrangement of a color laser printer according to the present invention.

FIG. 10 is a sectional view showing the schematic arrangement of a "color laser printer" serving as an image forming apparatus according to the first embodiment to which the present invention is applicable. The color laser printer is equipped with the piezoelectric transformer type high-voltage power supply device. Referring to FIG. 10, a color laser printer 401 includes a deck 402 that stores printing paper sheets 32, a paper sensor 403 that detects the presence/absence of the printing paper sheets 32 in the deck 402, and a pickup roller 404 that extracts the printing paper sheet 32 from the deck 402. The color laser printer 401 also includes a deck feed roller 405 that conveys the printing paper sheet 32 extracted by the pickup roller 404, and a retard roller 406 that pairs off with the deck feed roller 405 to prevent conveyance of multiple printing paper sheets 32. A registration roller pair 407 that synchronously conveys the printing paper sheet 32 and a pre-registration sensor 408 that detects the conveyance state of the printing paper sheet 32 to the registration roller pair 407 are disposed downstream from the deck feed roller 405.

An electrostatic adsorptive feeding transfer belt (to be referred to as an ETB hereinafter) 409 is arranged downstream from the registration roller pair 407. This image forming apparatus is a color laser printer and therefore includes exchangeable process cartridges 410 of a plurality of colors. Images formed by image forming units including process cartridges 410Y, 410M, 410C, and 410Bk and scanner units 420Y, 420M, 420C, and 420Bk of four colors (yellow Y, magenta M, cyan C, and black Bk), respectively, are sequentially overlaid on the ETB 409 by transfer rollers 430Y, 430M, 430C, and 430Bk, thereby forming a color image. The formed color image is transferred to the printing paper sheet 32. The printing paper sheet 32 is conveyed downstream. On the downstream side is a pair of a pressurizing roller 434 and a fixing roller 433 that incorporates a heater 432 to thermally fix the toner image transferred to the printing paper sheet 32. Also disposed are a discharge roller pair 435 configured to convey the printing paper sheet 32 from the fixing roller 433 and a discharge sensor 436 that detects the conveyance state from the fixing unit.

Each scanner unit 420 includes a laser unit 421 that emits a laser beam modulated based on an image signal output from a video controller 440, a polygon mirror 422 and a scanner motor 423 configured to scan the laser beam from the laser unit 421 on a photosensitive drum 305, and an imaging lens group 424. Each process cartridge 410 includes the photosensitive drum 305, a charging roller 303, a developing roller 302, and a toner container 411 necessary for the known electrophotography process. Each scanner unit 420 is detachable from the main body of the color laser printer 401. Upon receiving image data output from an external device 441 such as a personal computer, the video controller 440 bitmaps the received image data to generate an image signal for image formation.

An engine controller 201 of the color laser printer 401 is formed from, for example, various input/output control circuits (not shown) and a CPU 207 serving as a control unit including a RAM 207a, a ROM 207b, a timer 207c, a digital input/output port 207d, and a D/A port 207e. A high-voltage power supply (piezoelectric transformer type high-voltage power supply device) 202 includes a charging high-voltage power supply (not shown) and a developing high-voltage power supply (not shown) corresponding to the process cartridges 410, and a transfer high-voltage power supply (not shown) capable of outputting high voltages corresponding to the transfer rollers 430 using a piezoelectric transformer. Note that the image forming apparatus has been described by exemplifying a tandem type color image forming apparatus. However, any image forming apparatus using a high bias voltage is incorporated in the scope of the present invention.

[Control and Operation Procedure of Piezoelectric Transformer Type High-Voltage Power Supply]

FIGS. 1 and 2 show a block diagram and a flowchart illustrating the operation procedure of the piezoelectric transformer type high-voltage power supply according to the present invention. Note that in this embodiment, the output is described as a voltage. However, handling the output as a current is also incorporated in the scope of the present invention. The same reference numerals as in the conventional piezoelectric transformer type high-voltage power supply shown in FIG. 11 denote the same parts in the piezoelectric transformer type high-voltage power supply of the present invention. The engine controller 201 includes a pulse generator 2051 that gives a driving signal to the driving circuit, and an A/D converter 2052 that performs A/D conversion.

[Frequency Control]

Figure 4A:
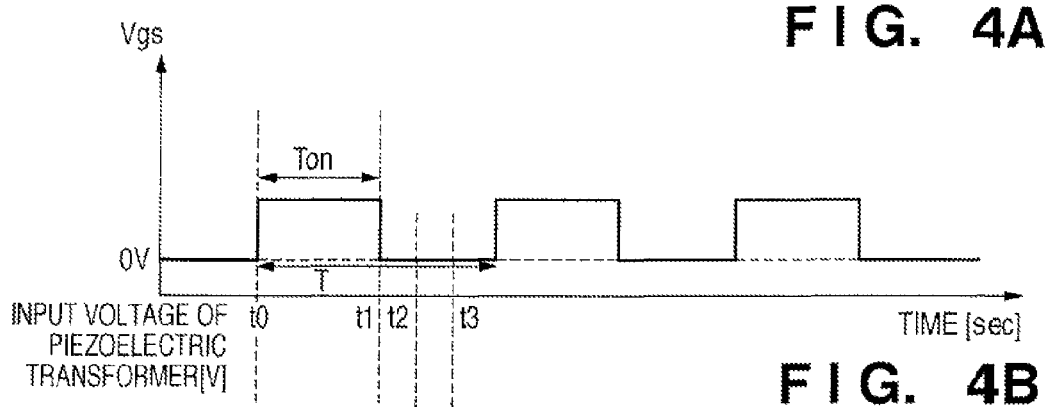
FIGS. 4A to 4D are timing charts showing operation waveforms in frequency control according to the first and second embodiments.
Figure 4B:
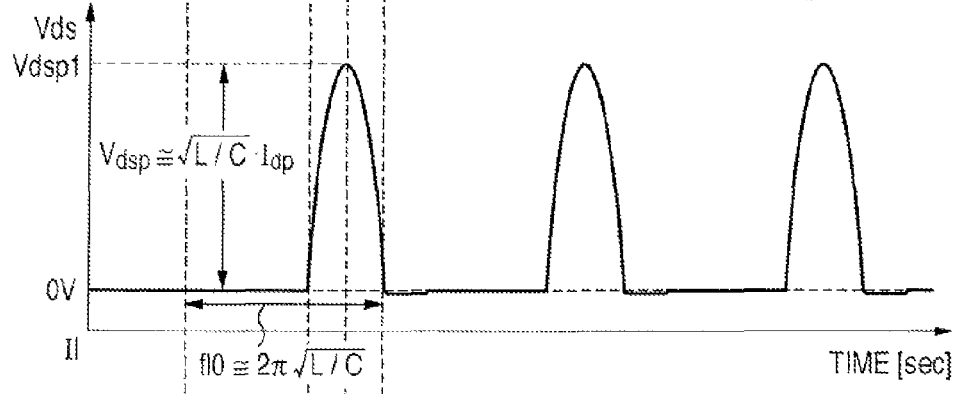
Figure 4C:
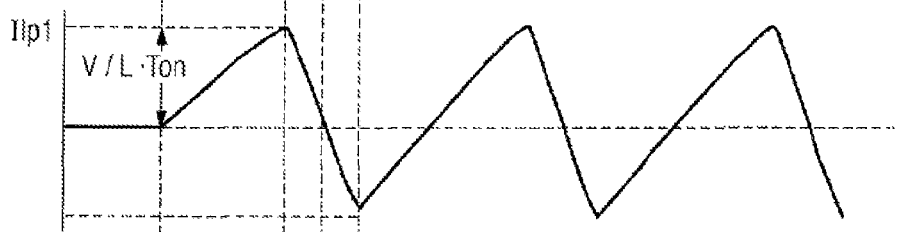
Figure 4D:
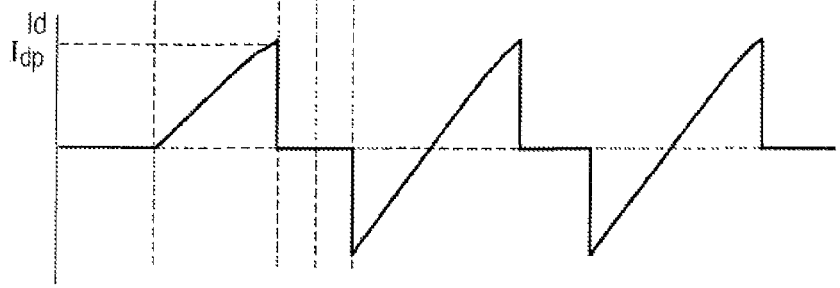

FIGS. 4A to 4D show operation waveforms in frequency control at the start of control when an LC resonance circuit that uses the FET 111 as the switching element, as shown in FIG. 1, serves as the driving circuit. FIGS. 4A to 4D show the following waveforms by plotting time along the abscissa. FIG. 4A shows a gate waveform Vgs of the FET 111, FIG. 4B shows a drain waveform Vds of the FET 111, that is, the driving voltage of the piezoelectric transformer 101, FIG. 4C shows a current waveform Il of the inductor 112, and FIG. 4D shows a drain current waveform Id. In this case, control is performed to change the frequency while fixing the duty (frequency control). Upon frequency control at the start of control, the ON duty of the pulse generator (Pulse Width Modulation: PWM) 2051 that generates a driving pulse is set within such a range that allows the switching element (FET 111) to do ZVS (Zero Voltage Switching), and the PWM controls the frequency. In this embodiment, an example will be explained in which the ON duty of the FET 111 in FIG. 4A is 50%. In an ON time Ton (t0 to t1) of the FET 111, Il matches Id. This indicates that the current from the inductor 112 all flows into the FET 111. When the FET 111 is turned off, Id instantaneously changes to zero, as shown in FIG. 4D. The inductor current Il that has flowed to the FET 111 thus far flows into a resonance capacitor 116 and the primary side static capacitance of the piezoelectric transformer 101 to charge them. The drain-source voltage Vds of the FET 111 begins rising. That is, as shown in FIG. 4D, immediately after the FET 111 has been turned off, the value of the voltage Vds largely jumps. The rising voltage waveform indicates the LC resonance phenomenon between the inductor 112, the resonance capacitor 116, and the primary side static capacitance of the piezoelectric transformer 101. A frequency f10 is approximately given by $$f10 \approx 1/2\pi\sqrt{LC} \quad (1)$$

In the ON time Ton (t0 to t1) of the FET, an inductor current waveform Ilp1 is approximately given by $$Ilp1 \approx V/L \cdot Ton \quad (2)$$

An energy E accumulated in the inductor 112 by Ilp1 is lost due to the resistance component, the wiring resistance, and the like of the inductor 112. If the loss is neglected, the energy E has the same value as that accumulated in the resonance capacitor 116 and the primary side static capacitance of the piezoelectric transformer 101 by a voltage amplitude Vdsp of Vds. Hence, $$E \approx 1/2 \cdot LIdp2 \approx 1/2 \cdot CVdsp2 \quad (3)$$

approximately holds. When equation (3) is solved for Vdsp, we obtain $$Vdsp \approx \sqrt{L/C} \cdot Idp \quad (4)$$

The resonance capacitor 116 and the primary side static capacitance of the piezoelectric transformer 101 are charged by Vdsp from t1 to t2. The resonance capacitor 116 and the primary side static capacitance of the piezoelectric transformer 101 are discharged from t2 to t3. At this time, the accumulated charges and the removed charges are of equal value. With this LC voltage resonance, the flyback voltage waveform serving as the input voltage waveform is generated and supplied to the primary side of the piezoelectric transformer. In the drain voltage waveform Vds shown in FIG. 4B, the time from t2 to t3 is determined by the constants of the inductor 112 and the resonance capacitor 116 and the input side static capacitance component of the piezoelectric transformer 101. In addition, Vdsp of the drain voltage waveform does not largely change in the zero voltage switching region. In this state, frequency sweep is performed in a rough frequency resolution at the start of control. The "rough frequency resolution" indicates a low frequency resolution. The "rough frequency resolution" suffices at the start because the control to a more appropriate high frequency resolution is done to approach the set voltage, as needed. Note that the specific "rough frequency resolution" to be used at the start may be obtained experimentally.

Duty Control

Upon determining that the input voltage has fallen within the range of set voltage V+α, the control is switched so as to change the duty while fixing the frequency of the pulse generator 2051 (duty control). The value +α (the value representing the allowable error range in which the voltage approximates the set voltage V) is defined in advance. The duty control is performed until the input voltage falls within the error range. Waveforms in duty control shown in FIGS. 5A to 5D will be described. The waveforms shown in FIGS. 5A to 5D correspond to those in FIGS. 4A to 4D, respectively. In the duty control, the switching element (FET 111) operates in the hard switching region that is not the zero voltage switching region. When the time Ton shortens up to the hard switching region, the current Ilp1 of the inductor 112 decreases in accordance with equation (2), as shown in FIG. 5C. When the current Ilp1 of the inductor 112 decreases, the energy accumulated in the inductor 112 decreases. As can be seen from equations (3) and (4), the energy accumulated in the inductor 112 equals that accumulated in the resonance capacitor 116 and the primary side static capacitance of the piezoelectric transformer 101 by the voltage amplitude Vdsp. Hence, when the energy of the inductor 112 decreases, the drain voltage Vdsp of the FET 111 decreases, as shown in FIG. 5B. That is, the input voltage of the piezoelectric transformer 101 decreases. Hence, the input voltage of the piezoelectric transformer 101 is changed in the hard switching region in correspondence with the time Ton that is the duty of the driving pulse, thereby controlling the output voltage of the piezoelectric transformer 101.

[Operation Procedure]

An explanation will be done next based in the operation procedure in FIG. 2. Note that at the start of the operation procedure, frequency control is performed, as shown in FIGS. 4A to 4D. The CPU 207 serving as the control unit of the engine controller 201 sets the set voltage value (S201). To drive the piezoelectric transformer 101, the CPU 207 sets the output frequency in the pulse generator 2051 (S202). The driving frequency set here is defined as the "rough frequency resolution". The voltage detection units 105, 106, and 107 formed from resistors detect the output voltage of the piezoelectric transformer 101. The A/D converter 2052 converts the output voltage from the analog signal into a digital signal. The CPU 207 compares the value converted by the A/D converter 2052 with the set voltage value, and determines whether the result of comparison with the set voltage value falls within a preset range (S203). If the comparison result falls outside the set range (NO in step S203), the pulse generator 2051 changes the output frequency serving as the driving signal from the high frequency side to the low frequency side. Thus changing the driving frequency is repeated until the voltage approximates the set voltage (S204). If the comparison result falls within the set range, the CPU 207 fixes the frequency set in the pulse generator 2051 at that time (S205).

From then on, duty control is performed, as shown in FIGS. 5A to 5D. While fixing the frequency output from the pulse generator 2051, the CPU 207 changes the duty of the output pulse (S206). In accordance with the duty change in step S206, the driving voltage of the piezoelectric transformer 101 changes in correspondence with the duty (S207). In addition, the output voltage changes in correspondence with the change in the driving voltage (S208). Note that steps S207 and S208 are phenomena caused not by the control unit but as the result of step S206. The voltage detection units 105, 106, and 107 formed from resistors detect the changed output voltage. The A/D converter 2052 converts the output voltage from the analog signal into a digital signal. The CPU 207 compares the value converted by the A/D converter 2052 with the set voltage value, and determines whether the result of comparison with the set voltage value falls within a preset range (S209). If the comparison result falls outside the set range (NO in step S209), the process returns to step S206 to change the duty of the driving pulse until the output voltage value reaches the target set voltage value. If the output voltage equals the set voltage (YES in step S209), the voltage will be controlled by the current duty (S210), and the processing procedure ends.

An example will be described here in which the pulse generator 2051 includes a digital counter circuit, and the driving frequency is 200 MHz. In step S204, the 10-bit counter (the MAX count is 1024) changes the counts of both H and L pulses, thereby changing the frequency stepwise. For example, when 602 pulses are counted in both H and L levels (the count is 1204 in one period) for pulse generation, the output frequency value is 166.113 KHz. When the frequency is fixed to this output frequency, the count is 1204 in one period. In step S206, the duty is changed by incrementing the H pulse count by one and decrementing the L pulse count by one so as to count 603 H pulses and 601 L pulses. That is, the H pulse count and the L pulse count are changed without changing the total count of H and L pulses. In the above-described example, the duty is changed by 0.08% each time. When the duty is changed by 0.1%, an output voltage change of about 2 V is obtained.

Figure 3A:
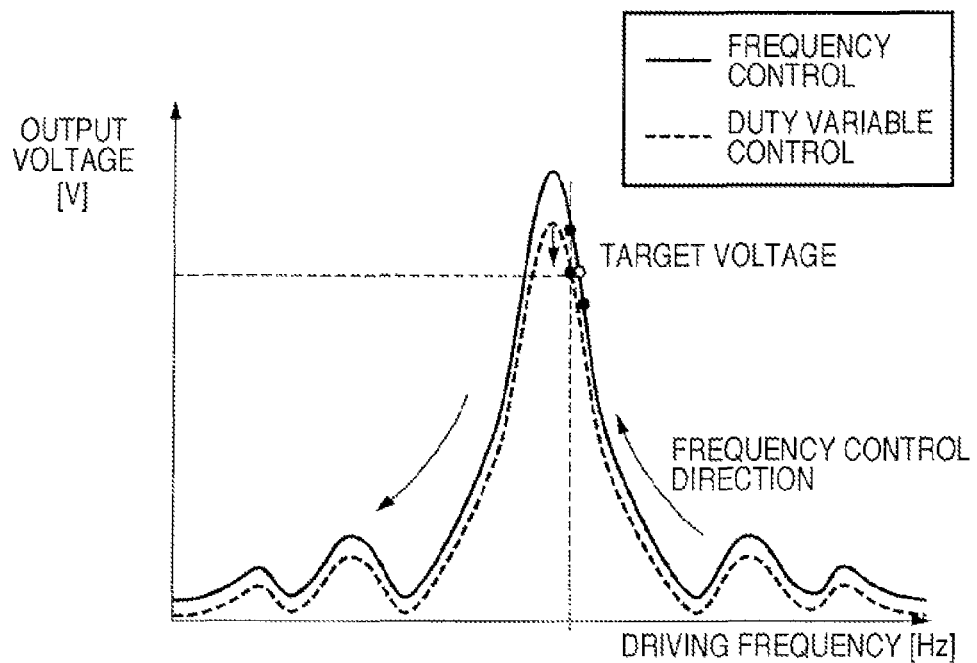
FIGS. 3A and 3B are graphs showing the F-V characteristic of a piezoelectric transformer according to the first embodiment.
Figure 3B:
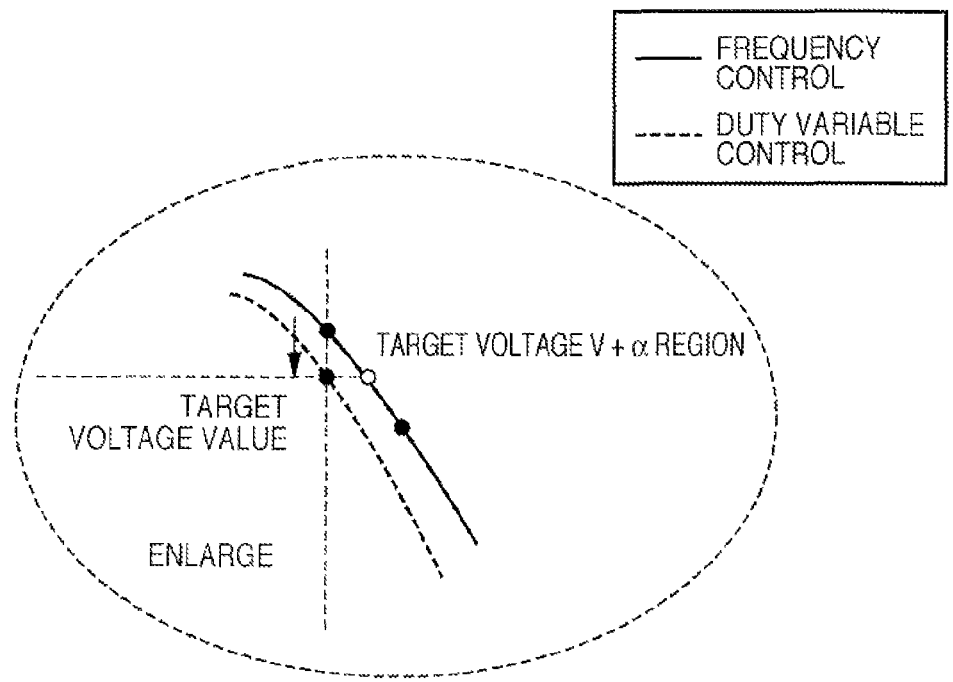

The above operation will be described with reference to FIGS. 3A and 3B showing the F-V characteristic of the piezoelectric transformer. FIG. 3B is an enlarged view of part of FIG. 3A. The solid line indicating frequency control represents the F-V characteristic until determining that the voltage falls within the range of set voltage V+α by sweeping the frequency in the rough frequency resolution from a frequency much higher than the resonance frequency of the piezoelectric transformer to a lower frequency. If the voltage falls within the range of set voltage V+α, the control is switched to duty control indicated by the broken line. The duty control is performed in a high resolution while fixing the frequency, thereby controlling the input voltage of the piezoelectric transformer in correspondence with the duty. The peak of the F-V characteristic is thus finely adjusted to control to the desired set voltage of the target value. The sweep may be done from a much lower frequency to a higher frequency.

As described above, the driving frequency of the piezoelectric transformer is changed at first in a rough frequency resolution. It is determined whether the voltage falls within the range of set voltage V+α. If the voltage falls within the set voltage range, the duty is changed to control to the desired set voltage. This allows to accurately control the output voltage without speeding up the operation clock of the CPU or the ASIC.

Second Embodiment

Figure 6:
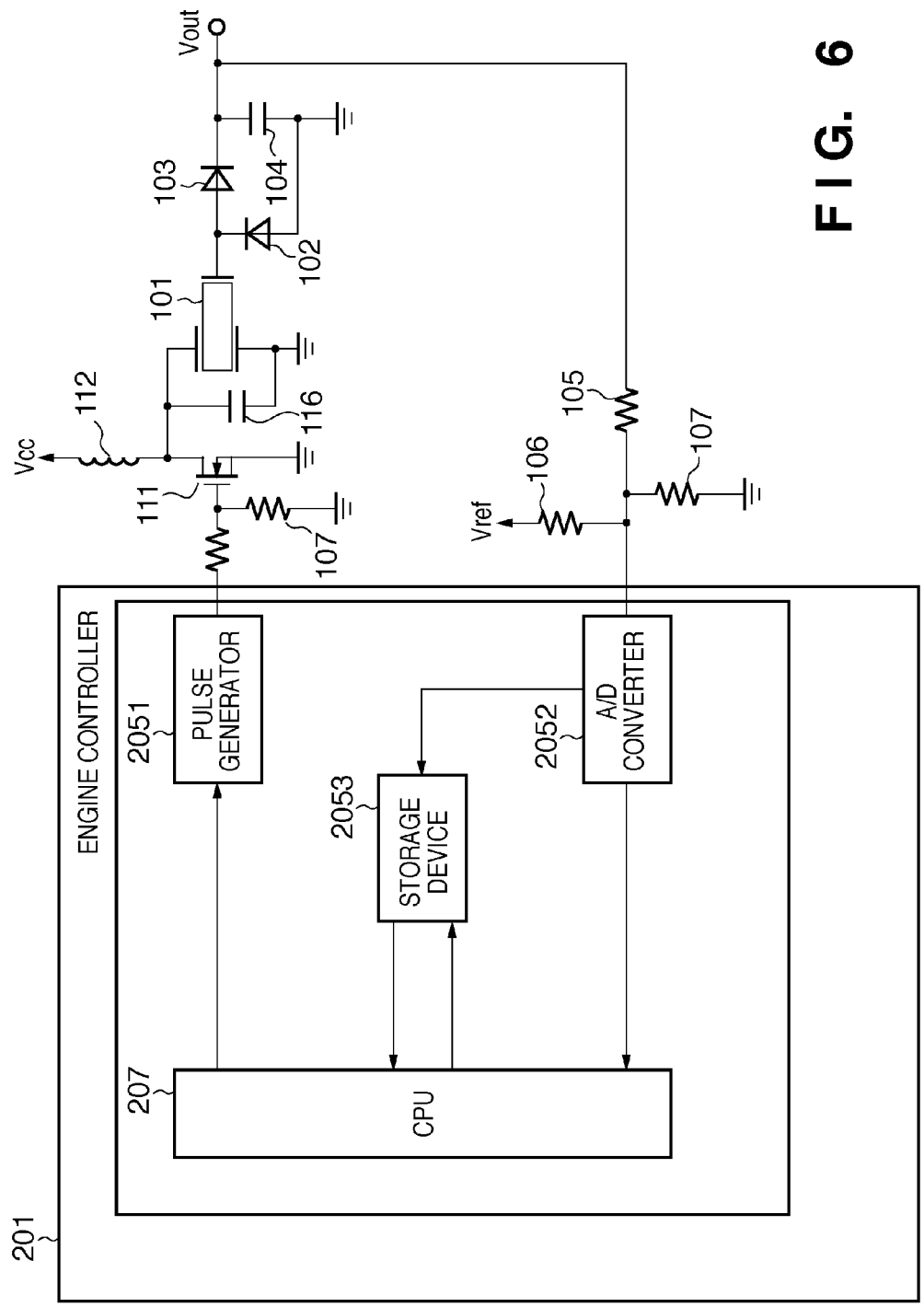
FIG. 6 is a block diagram showing the arrangement of a piezoelectric transformer type high-voltage power supply according to the second and third embodiments.
Figure 7:
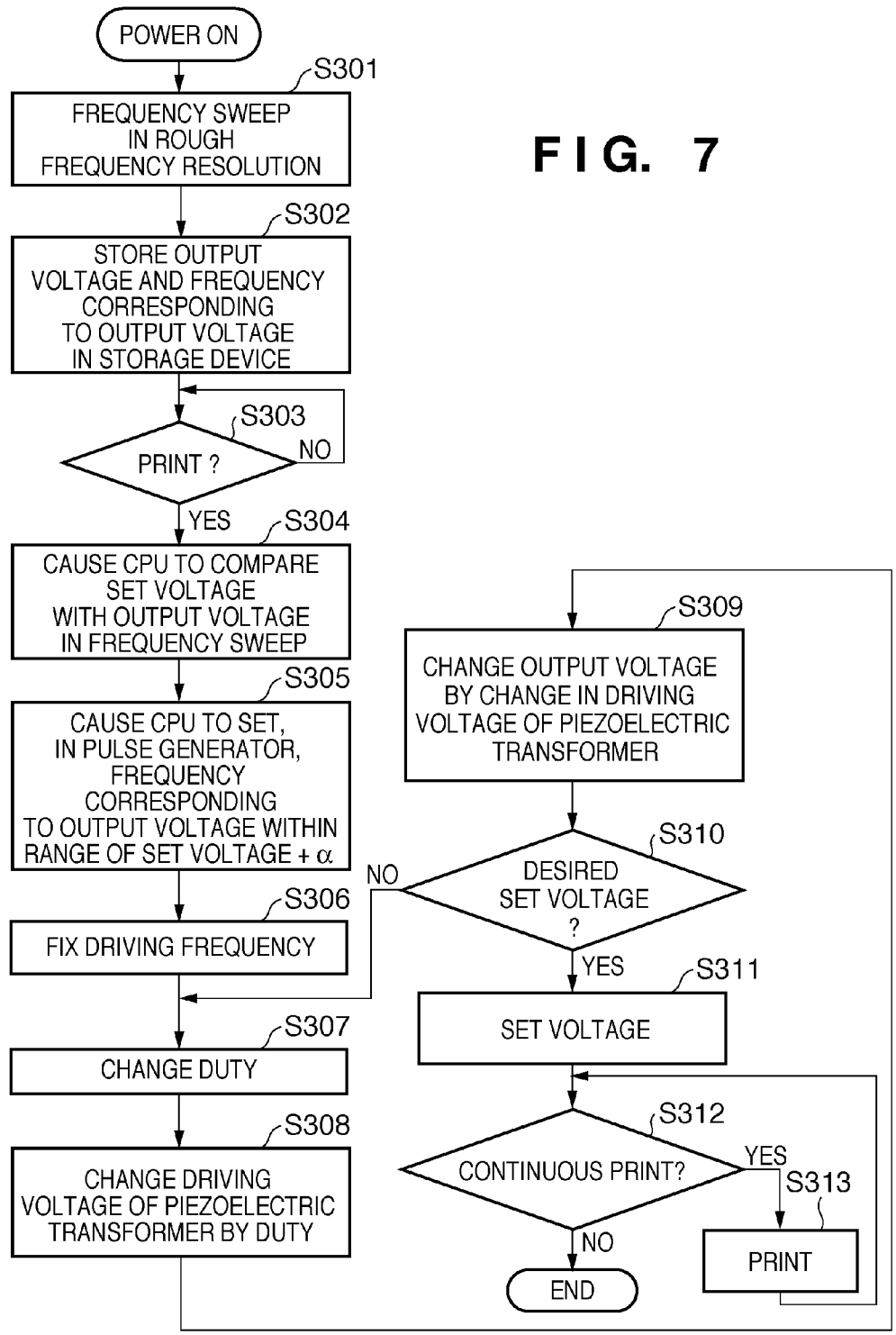
FIG. 7 is a flowchart of control according to the second embodiment.

The second embodiment of the present invention will be described below based on FIGS. 6 and 7. In this embodiment, frequency sweep is performed, and the frequency and the output voltage (or output current) at that time are stored in association with each other. A frequency corresponding to an output voltage that approximates a set voltage is selected from the stored information and used for control. FIGS. 6 and 7 show a block diagram and a flowchart illustrating the operation procedure of a piezoelectric transformer type high-voltage power supply according to the present invention. A description of the same parts as in the first embodiment will be omitted. Note that FIG. 6 is different from FIG. 1 in that an engine controller 201 incorporates a storage device 2053.

FIGS. 6 and 7 show a block diagram and a flowchart illustrating the operation procedure of the piezoelectric transformer type high-voltage power supply according to the present invention. Referring to FIG. 7, when the color printer is powered on, a CPU 207 in the engine controller 201 sweeps the output frequency of a pulse generator 2051 from a higher frequency to a lower frequency within a predetermined range (S301). The CPU 207 stores, in the storage device 2053, the piezoelectric transformer output detection result obtained by the frequency sweep and the frequency set value of the pulse generator 2051 corresponding to the output value (S302).

Figure 8:
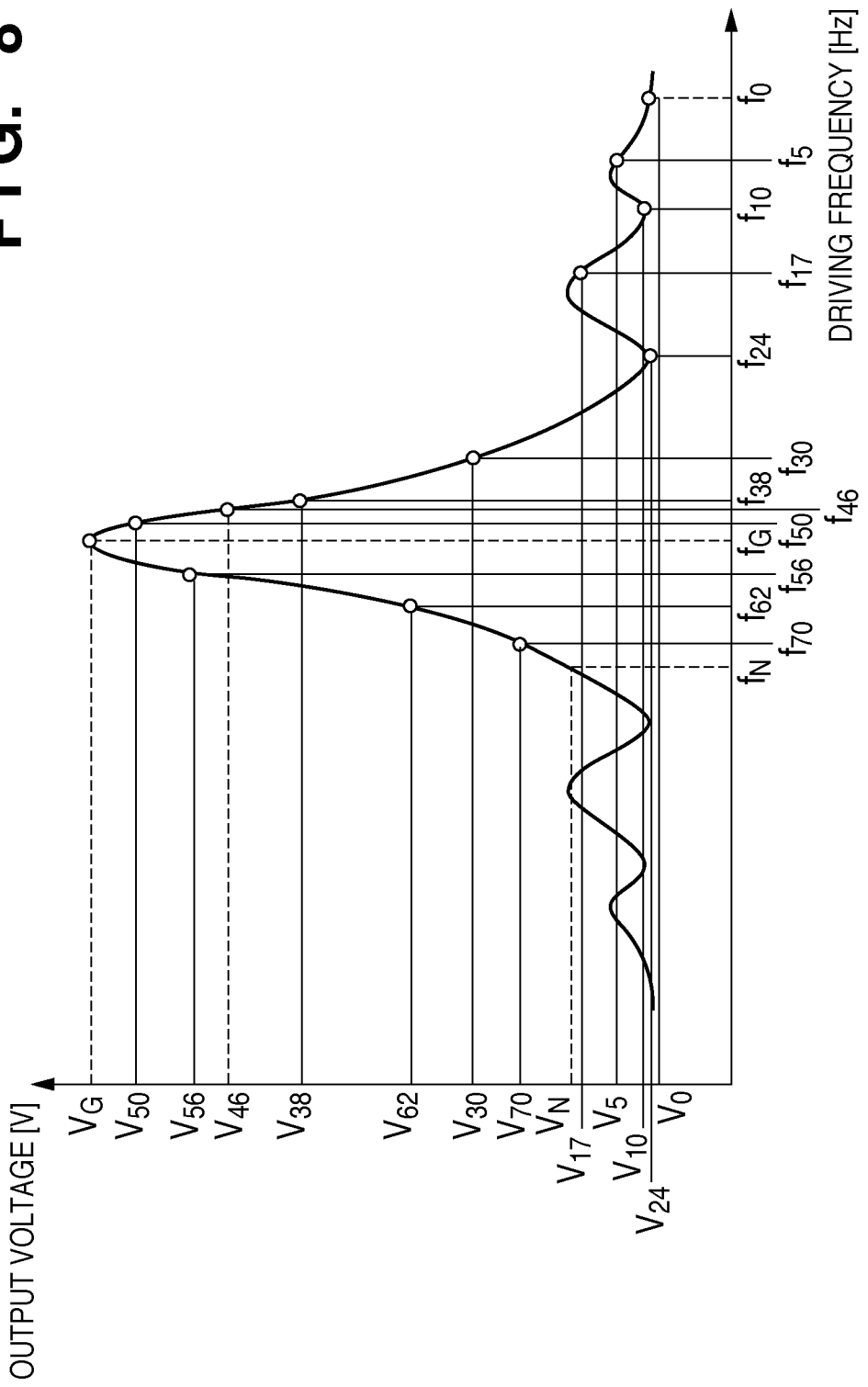
FIG. 8 is a graph showing the F-V characteristic in frequency sweep according to the second embodiment.

FIG. 8 shows the F-V characteristic of a piezoelectric transformer 101 in the frequency sweep. Let f0 be the maximum frequency in the frequency sweep, and V0 be the corresponding voltage detection value. The frequency sweep is done up to a minimum frequency fn. The frequency set values (f0, ..., $f_G$, ..., $f_N$) and the voltage detection values (V0, ..., $V_G$, ..., $V_N$) corresponding to them are stored in the storage device 2053.

At the start of printing (S303), the CPU 207 compares the preset set voltage value with the voltage detection result stored in the storage device 2053 at the time of frequency sweep (S302), and determines whether the comparison result falls within a preset range (set voltage V+α) (S304). The CPU 207 acquires, from the storage device 2053, the output frequency set value of the pulse generator 2051 corresponding to the voltage detection result of which the comparison result falls within the preset range, and sets the frequency in the pulse generator 2051 (S305). The CPU 207 then fixes the output frequency set in the pulse generator 2051 (S306). After that, the CPU 207 changes the duty of the pulse generator 2051 to control the output voltage of the piezoelectric transformer to the set voltage, as in steps S206 to S210 of FIG. 2 (S307 to S311). If printing is to be continuously executed after the voltage setting (YES in step S312), the processing is performed (S313). When printing is all competed, the processing ends.

As described above, control information and output information of frequency sweep performed at a predetermined timing are held. The correspondence information of the output voltage and the frequency, which is necessary for comparison, in the F-V characteristic of the piezoelectric transformer 101 is acquired. This allows to shorten the arrival time of the set voltage at the start of control. It is also possible to obtain the same effect as in the first embodiment concerning the accuracy of the output voltage of the piezoelectric transformer.

Note that the frequency sweep performed at a predetermined timing in a predetermined frequency range can be either sweep from a frequency much higher than the resonance frequency of the piezoelectric transformer 101 to a lower frequency or sweep from a much lower frequency to a higher frequency.

Figure 11:
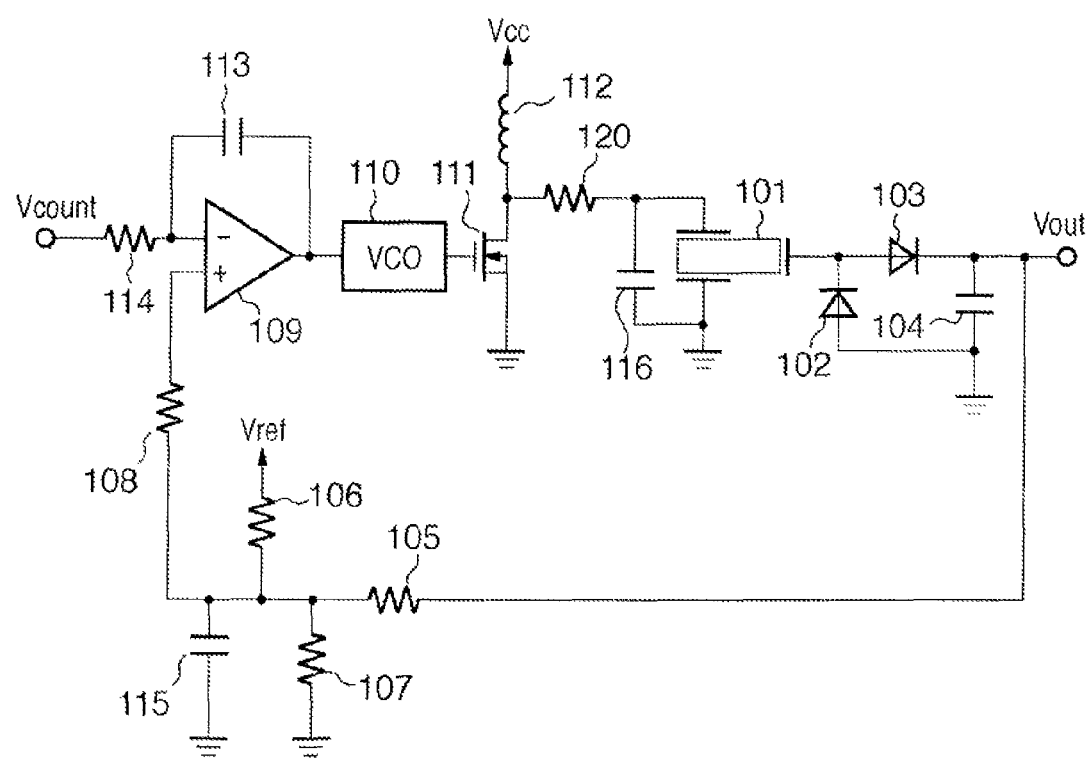
FIG. 11 is a circuit diagram for explaining a conventional piezoelectric transformer type high-voltage power supply.

In addition, the frequency sweep performed at a predetermined timing in a predetermined frequency range may be executed either after powering on the image forming apparatus (including a capacitor 115 and a resistance 120) of the prior art shown in FIG. 11 or upon initialization when returned from the power saving mode. To compensate for a change in the resonance frequency caused by the temperature rise of the piezoelectric transformer 101 and a time-rate change in the load, the frequency sweep may be executed after the image forming apparatus has printed a predetermined number of sheets so as to update the data in the storage device 2053. This is also applicable to compensate for a load variation caused by exchanging process cartridge 410. Upon detecting exchange of at least one of process cartridges 410Y, 410M, 410C, and 410Bk of the image forming apparatus, the CPU 207 may execute the frequency sweep to update the data in the storage device 2053.

Third Embodiment

Figure 9:
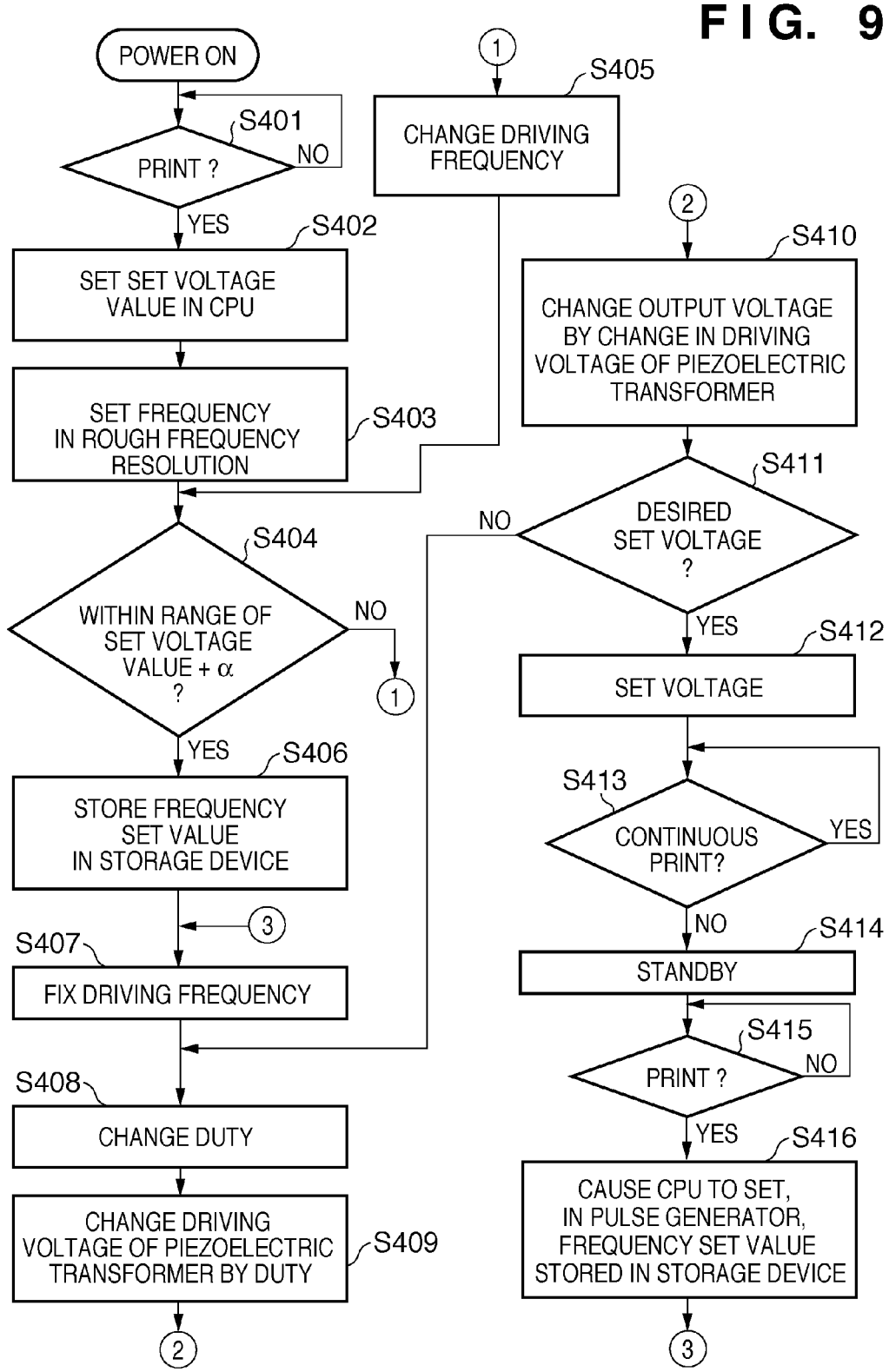
FIG. 9 is a flowchart of control according to the third embodiment.

The third embodiment of the present invention will be described below based on FIGS. 6 and 9. In this embodiment, a frequency that approximates the output voltage to the set voltage is stored at a predetermined timing, and the output voltage (or output current) is controlled using the stored frequency any time other than the predetermined timing. FIGS. 6 and 9 show a block diagram and a flowchart illustrating the operation procedure of a piezoelectric transformer type high-voltage power supply according to the present invention. A description of the same parts as in the first and second embodiments will be omitted. Consider, for example, print control executed at the start of a predetermined timing after powering on the color printer or when returned from the power saving mode. In this case, a CPU 207 changes the frequency from a frequency much higher than the resonance frequency of a piezoelectric transformer 101 to a lower frequency until determining that the output voltage falls within the preset voltage range V+α, as in steps S401 to S405 of FIG. 9. Unlike the first embodiment, upon determining that the output voltage falls within the set voltage range V+α in the processing procedure of FIG. 9, the CPU 207 stores the used output frequency set value of a pulse generator 2051 in a storage device 2053 (S406). After determining whether the output voltage falls within the set voltage range V+α, the CPU 207 fixes the frequency of the pulse generator 2051 and controls to the set voltage V by duty control (S407 to S413).

When the color printer transits from the standby state (S414) to print control (YES in step S415), the CPU 207 acquires the frequency set value stored in the storage device 2053 in the previous print control, and sets it in the pulse generator 2051 (S416). Like the above-described procedure, the CPU 207 fixes the output frequency of the pulse generator 2051 to the set frequency (S406). The CPU 207 controls the duty of the pulse generator 2051 (S407) to control the output voltage of the piezoelectric transformer 101 to the set voltage value (S408 to S412).

As described above, the output voltage of the piezoelectric transformer can be controlled in every print control without changing the frequency from a frequency much higher than the resonance frequency of the piezoelectric transformer. This allows to shorten the rising time to the set voltage.

Note that the frequency may change from a frequency much lower than the resonance frequency of the piezoelectric transformer to a higher frequency. As for the predetermined timing, to compensate for a change in the resonance frequency caused by the temperature rise of the piezoelectric transformer 101 and a time-rate change in the load, the setting may be executed in print control after the image forming apparatus has printed a predetermined number of sheets so as to update the data in the storage device 2053. This is also applicable to compensate for a load variation caused by exchanging process cartridge 410. Upon detecting exchange of at least one of process cartridges 410Y, 410M, 410C, and 410Bk of the image forming apparatus, the CPU 207 may execute the setting even in print control after the exchange to update the data in the storage device 2053.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-119730, filed May 25, 2010, which is hereby incorporated by reference herein in its entirety.

What is claimed is:

1. A high-voltage power supply device comprising:
a piezoelectric transformer;
a driving unit of said piezoelectric transformer;
a detection unit configured to detect an output of said piezoelectric transformer; and
a control unit configured to control the output of said piezoelectric transformer by giving a driving signal to said driving unit so that the output detected by said detection unit reaches a target value,
wherein said control unit changes a frequency of the driving signal without changing a duty of the driving signal so as to set the frequency of the driving signal such that the output detected by said detection unit falls within a predetermined range including the target value, and after setting the frequency for the driving signal such that the output detected by said detection unit falls within the predetermined range, changes the duty of the driving signal so that the output detected by said detection unit reaches the target value.

2. The device according to claim 1, further comprising a rectification unit configured to rectify an output of said piezoelectric transformer,
wherein said detection unit includes a conversion unit configured to convert an output value of said piezoelectric transformer via said rectification unit into a digital signal, and
said control unit controls the output of said piezoelectric transformer in accordance with the digital signal converted by said conversion unit.

3. The device according to claim 1, wherein when changing the frequency, said control unit switches stepwise the frequency to be supplied to said driving unit, and a switching range of the frequency includes a resonance frequency of said piezoelectric transformer.

4. An image forming apparatus comprising:
an image forming unit configured to form an image; and
a high-voltage power supply configured to output a high voltage to said image forming unit,
said high-voltage power supply comprising a piezoelectric transformer, a driving unit of said piezoelectric transformer, a detection unit configured to detect an output of said piezoelectric transformer, and a control unit configured to control the output of said piezoelectric transformer by giving a driving signal to said driving unit so that the output detected by said detection unit reaches a target value,
wherein said control unit changes a frequency of the driving signal without changing a duty of the driving signal so as to set the frequency of the driving signal such that the output detected by said detection unit falls within a predetermined range including the target value, and after setting the frequency for the driving signal such that the output detected by said detection unit falls within the predetermined range, changes the duty of the driving signal so that the output detected by said detection unit reaches the target value.

5. The image forming apparatus according to claim 4, further comprising a rectification unit configured to rectify an output of said piezoelectric transformer,
wherein said detection unit includes a conversion unit configured to convert an output value of said piezoelectric transformer via said rectification unit into a digital signal, and
wherein said control unit controls the output of said piezoelectric transformer in accordance with the digital signal converted by said conversion unit.

6. The image forming apparatus according to claim 4, wherein when changing the frequency, said control unit switches stepwise the frequency to be supplied to said driving unit, and a switching range of the frequency includes a resonance frequency of said piezoelectric transformer.

7. A high-voltage power supply device comprising:
a piezoelectric transformer;
a driving unit of said piezoelectric transformer;
a detection unit configured to detect an output of said piezoelectric transformer;
a control unit configured to control the output of said piezoelectric transformer by giving a driving signal to said driving unit so that the output detected by said detection unit reaches a target value; and
a storage unit configured to store a frequency of the driving signal and a value of the output detected by said detection unit and corresponding to the frequency of the driving signal in association with each other,
wherein said control unit causes said storage unit to store the frequency of the driving signal given to said driving unit and the value of the output detected by said detection unit corresponding to the frequency of the driving signal in association with each other upon sweeping the driving signal, sets the frequency of the driving signal to said driving unit based on the frequency of the driving signal and the value of the output detected by said detection unit corresponding to the frequency stored in said storage unit such that the output detected by said detection unit falls within a predetermined range with respect to the target value, and after that, changes a duty of the driving signal so that the value of the output detected by said detection unit reaches the target value.

8. The device according to claim 7, further comprising a rectification unit configured to rectify an output of said piezoelectric transformer,
wherein said detection unit includes a conversion unit configured to convert an output value of said piezoelectric transformer via said rectification unit into a digital signal, and
wherein said control unit controls the output of said piezoelectric transformer in accordance with the digital signal converted by said conversion unit.

9. The device according to claim 7, wherein when changing the frequency, said control unit switches stepwise the frequency to be supplied to said driving unit, and a switching range of the frequency includes a resonance frequency of said piezoelectric transformer.

10. A high-voltage power supply device comprising:
a piezoelectric transformer;
a driving unit of said piezoelectric transformer;
a detection unit configured to detect an output of said piezoelectric transformer;
a control unit configured to control the output of said piezoelectric transformer by giving a driving signal to said driving unit so that the output detected by said detection unit reaches a target value; and
a storage unit configured to store a frequency of the driving signal and a value of the output detected by said detection unit and corresponding to the frequency of the driving signal in association with each other,
wherein said control unit changes the frequency of the driving signal without changing a duty of the driving signal such that the value of the output detected by said detection unit falls within a predetermined range with respect to the target value, causes said storage unit to store the frequency of the driving signal for the output detected by said detection unit within the predetermined range with respect to the target value, supplies the frequency of the driving signal for the output detected by said detection unit within the predetermined range with respect to the target value to said driving unit using the frequency of the driving signal stored in said storage unit, and after that, changes the duty of the driving signal so that the value of the output detected by said detection unit reaches the target value.

11. The device according to claim 10, further comprising a rectification unit configured to rectify an output of said piezoelectric transformer,
wherein said detection unit includes a conversion unit configured to convert an output value of said piezoelectric transformer via said rectification unit into a digital signal, and
wherein said control unit controls the output of said piezoelectric transformer in accordance with the digital signal converted by said conversion unit.

12. The device according to claim 10, wherein when changing the frequency, said control unit switches stepwise the frequency to be supplied to said driving unit, and a switching range of the frequency includes a resonance frequency of said piezoelectric transformer.

13. An image forming apparatus comprising:
an image forming unit configured to form an image; and
a high-voltage power supply configured to output a high voltage to said image forming unit,
said high-voltage power supply comprising a piezoelectric transformer, a driving unit of said piezoelectric transformer, a detection unit configured to detect an output of said piezoelectric transformer, a control unit configured to control the output of said piezoelectric transformer by giving a driving signal to said driving unit so that the output detected by said detection unit reaches a target value, and a storage unit configured to store a frequency of the driving signal and a value of the output detected by said detection unit and corresponding to the frequency of the driving signal in association with each other,
wherein said control unit changes the frequency of the driving signal without changing a duty of the driving signal such that the value of the output detected by said detection unit falls within a predetermined range with respect to the target value, causes said storage unit to store the frequency of the driving signal for the output detected by said detection unit within the predetermined range with respect to the target value, supplies the frequency of the driving signal to said driving unit using the frequency of the driving signal stored in said storage unit so that the output detected by said detection unit falls within the predetermined range with respect to the target value, and after that, changes the duty of the driving signal so that the value of one of an output voltage detected by said detection unit and an output current detected by said detection unit reaches the target value.

14. The image forming apparatus according to claim 13, further comprising a rectification unit configured to rectify an output of said piezoelectric transformer,
wherein said detection unit includes a conversion unit configured to convert an output value of said piezoelectric transformer via said rectification unit into a digital signal, and
wherein said control unit controls the output of said piezoelectric transformer in accordance with the digital signal converted by said conversion unit.

15. The image forming apparatus according to claim 13, wherein when changing the frequency, said control unit switches stepwise the frequency to be supplied to said driving unit, and a switching range of the frequency includes a resonance frequency of said piezoelectric transformer.

16. An image forming apparatus comprising:
an image forming unit configured to form an image; and
a high-voltage power supply configured to output a high voltage to said image forming unit,
said high-voltage power supply comprising a piezoelectric transformer, a driving unit of said piezoelectric transformer, a detection unit configured to detect an output of said piezoelectric transformer, a control unit configured to control the output of said piezoelectric transformer by giving a driving signal to said driving unit so that the output detected by said detection unit reaches a target value, and a storage unit configured to store a frequency of the driving signal and a value of the output detected by said detection unit and corresponding to the frequency of the driving signal in association with each other,
wherein said control unit changes the frequency of the driving signal without changing a duty of the driving signal such that the value of the output detected by said detection unit falls within a predetermined range with respect to the target value, causes said storage unit to store the frequency of the driving signal for the output detected by said detection unit within the predetermined range with respect to the target value, supplies the frequency of the driving signal for the output detected by said detection unit within the predetermined range with respect to the target value to said driving unit using the frequency of the driving signal stored in said storage unit, and after that, changes the duty of the driving signal so that the value of the output detected by said detection unit reaches the target value.

17. The image forming apparatus according to claim 16, further comprising a rectification unit configured to rectify an output of said piezoelectric transformer,
wherein said detection unit includes a conversion unit configured to convert an output value of said piezoelectric transformer via said rectification unit into a digital signal, and
wherein said control unit controls the output of said piezoelectric transformer in accordance with the digital signal converted by said conversion unit.

18. The image forming apparatus according to claim 16, wherein when changing the frequency, said control unit switches stepwise the frequency to be supplied to said driving unit, and a switching range of the frequency includes a resonance frequency of said piezoelectric transformer.

19. A high-voltage power supply device which comprises a piezoelectric transformer, a driving unit configured to drive the piezoelectric transformer, and a control unit configured to output a driving signal to the driving unit, wherein
the control unit comprises:
a first control unit configured to change a frequency of the driving signal with setting an on duty of the driving signal to a predetermined value, and
a second control unit configured to change an on duty of the driving signal with setting a frequency of the driving signal to a predetermined frequency.

20. The device according to claim 19, further comprising a detection unit configured to detect an output of the piezoelectric transformer, and
wherein the control unit controls the driving signal so that the output detected by the detection unit reaches a target value.

21. The device according to claim 19, wherein the driving unit includes a switching unit configured to drive a primary side of the piezoelectric transformer, and
wherein the primary side of the piezoelectric transformer is driven by supplying the driving signal to the switching unit.

22. The device according to claim 19, wherein the on duty of the driving unit is a rate of on term to one period of the driving signal.

23. The device according to claim 19, further comprising a detection unit configured to detect an output of the piezoelectric transformer
wherein the control unit converts the output detected by the detection unit into a digital value, and controls the driving signal based on the converted digital value.

24. An image forming apparatus, which comprises a processing unit configured to form an image, and a high-voltage power supply configured to supply a high voltage to the processing unit, wherein
the high-voltage power supply comprises a piezoelectric transformer, a driving unit configured to drive the piezoelectric transformer, and a control unit configured to output a driving signal to the driving unit, and
the control unit comprises:
a first control unit configured to change a frequency of the driving signal with setting an on duty of the driving signal to a predetermined value, and
a second control unit configured to change an on duty of the driving signal with setting a frequency of the driving signal to a predetermined frequency.

25. The apparatus according to claim 24, wherein the processing unit includes at least one of a charging unit configured to charge an image carrier, a developing unit configured to develop a latent image formed on the image carrier, and transfer unit configured to transfer an image developed by the developing unit into a transfer member.

26. The apparatus according to claim 24, further comprising a detection unit configured to detect an output of the piezoelectric transformer, and
wherein the control unit controls the driving signal so that the output detected by the detection unit reaches a target value.

27. The apparatus according to claim 24, wherein the driving unit includes a switching unit configured to driving a primary side of the piezoelectric transformer, and wherein the primary side of the piezoelectric transformer is driven by supplying the driving signal to the switching unit.

28. The apparatus according to claim 24, wherein the on duty of the driving unit is a rate of on term to one period of the driving signal.

29. The apparatus according to claim 24, further comprising a detection unit configured to detect an output of the piezoelectric transformer,
   wherein the control unit converts the output detected by the detection unit into a digital value, and controls the driving signal based on the converted digital value.

* * * * *